Nov. 29, 1966  R. E. MOORE  3,287,760
MAGNETIC HINGE
Filed March 11, 1964
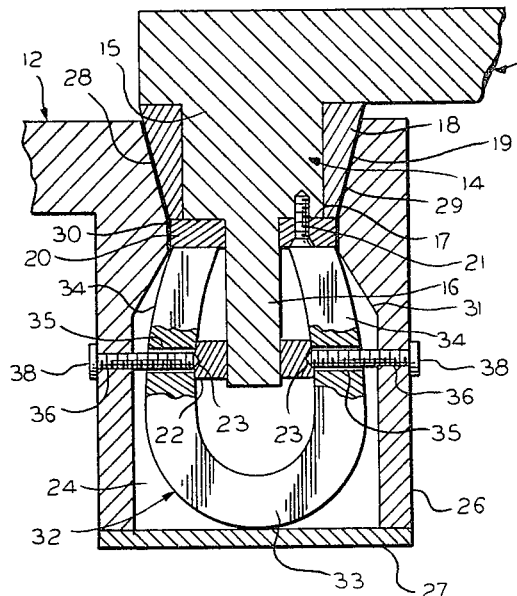
FIG.1
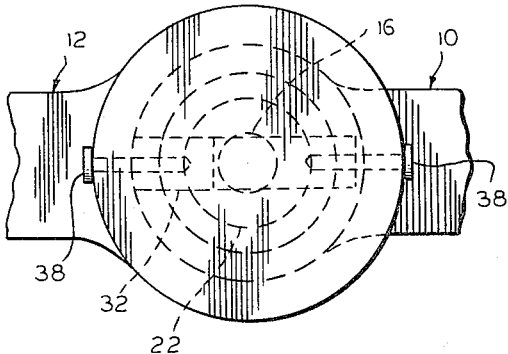
FIG. 2
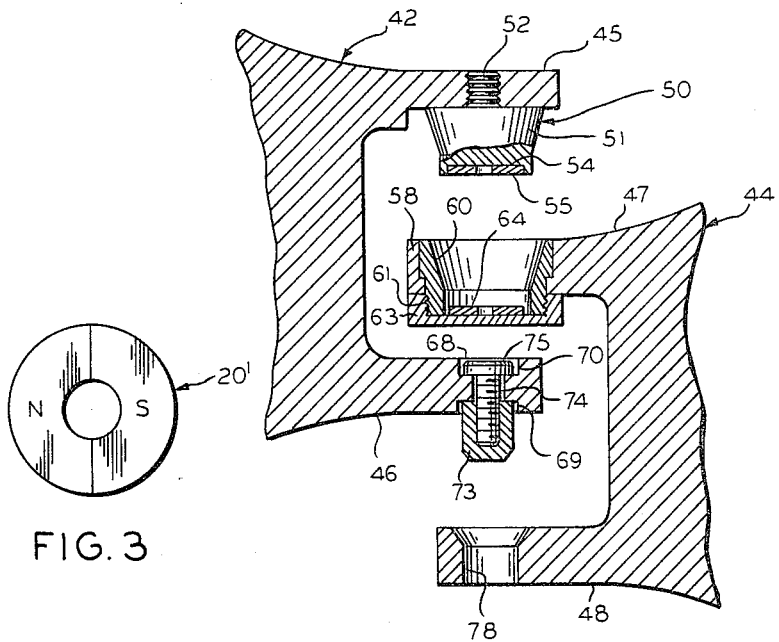
FIG. 3
FIG. 4
INVENTORS
ROBERT E. MOORE
BY *Lindberg*
ATTORNEY United States Patent Office 3,287,760
Patented Nov. 29, 1966

3,287,760
MAGNETIC HINGE
Robert E. Moore, Winnetka, Ill.
Filed Mar. 11, 1964, Ser. No. 350,988
8 Claims. (Cl. 16—171)

This invention generally relates to connectors and more particularly relates to a novel and improved hinge adaptable for use in establishing releasable interconnection between a pair of members to be joined together.

Hinged connections are useful in numerous applications requiring releasable interconnection between elements while permitting relative rotation at the point of connection. In this relation, it is desirable that the members be capable of positive connection and disconnection as desired without the insertion or removal of special connecting parts or the use of special tools. It is desirable also that the elements be capable of undergoing a wide angle of rotation, all the while being accurately aligned to close dimensional tolerances for smooth rotation about the connection axis. In a special environment of the invention, this may be typified by the connection of binocular halves where the halves are connected in hinged relationship and are adjustable about the hinge axis to regulate the spacing or pupillary distance between the eye lenses. Here, the hinge portions should be accurately aligned when connected so that upon rotation or adjustment about the hinge axis the optical axes of the binocular halves will remain in exact parallel relation to one another. Furthermore, it is of special advantage to provide for positive connection but separation as desired of the halves without insertion or removal of other connecting elements.

Accordingly, it is an object of the present invention to provide for a connector of novel and improved construction which can conform for use in establishing positive but releasable connection between members, all without the use of separate connecting elements or tools.

It is another object of the present invention to provide for a hinged connection of simple and efficient construction affording a releasable connection between a pair of members with selective rotation therebetween about the axis of connection.

It is a further object of the present invention to provide for a hinge having hinge portions capable of being releasably connected and accurately centered and aligned for mutual or independent rotation about a common axis; and additionally wherein a magnetic junction is established between the hinge portions in such a way as positively but releasably to interconnect the portions for relative rotation throughout any desired angle.

It is a still further object of the present invention to provide for a novel and improved hinged connection for binocular halves which will enable positive releasable connection with close accurate alignment between the halves when in connected relation, in such relation the halves being independently or mutually rotated about the center axis of connection to regulate the pupillary distance between the binocular lenses, and in such arrangement the binocular halves being connected under a variable or controlled amount of force and aligned for rotation to very close dimensional tolerances.

The above and other objects, advantages and features of the present invention will become more readily understood and appreciated from a consideration of the following detailed description of alternate forms of the present invention when taken together with the accompanying drawing, in which:

FIG. 1 is a fragmentary sectional view, parts being shown in elevation of one form of hinge in accordance with the present invention;

FIG. 2 is an end view of the embodiment shown in FIG. 1;

FIG. 3 is a detailed end view of alternate form of magnetic disk element; and

FIG. 4 is a sectional view of an alternate form of invention, and illustrated for use in interconnecting the halves of a binocular.

Referring now to FIGS. 1 and 2 of the drawings, there is shown a pair of members to be joined and which may for example be representative of binocular halves having hinge portions 10 and 12. Hinge portion 10 has a cylindrical boss 14 consisting of a first cylindrical portion 15 and a reduced cylindrical extremity 16, there being a shoulder 17 formed at the juncture of the cylindrical portions 15 and 16. A frustro-conical thrust member 18 is fitted on the cylindrical portion 15 and has a conical bearing surface 19. A ring or annular disk 20, which is preferably composed of a ferrous metal or other suitable magnetic material is placed over the extremity 16 and against the shoulder 17 by screws 21.

A bearing ring 22 is located in with respect to the extremity 16 in spaced relationship to the ring 20.

The hinge portion 10 is adapted to be supported for rotation with respect to and connection with hinge portion 12, and to this end the end of hinge portion 12 is provided with a hollow machined boss 26 defining a cavity 24 which is designed for insertion therein of the cylindrical boss 14 comprising cylindrical portion 15 and extremity 16. As will be described, the hollow boss 26, the boss 14 and extremity 16 cooperate with additional structure for rotation of the portions 10 and 12 about an axis of connection.

To this end, the machined boss 26 has a flat bottom or base plate 27 closing the lower end thereof. An entrance or limited opening 28 is provided at the upper end of boss 26. Preferably, the entrance 28 has a converging taper configuration and is lined with a frustro-conical bearing element 29 to define a bearing surface for the conical bearing surface 19 of member 18.

The tapered surface of entrance 28 is continuous with an annular surface 30 of limited extent and a divergent wall 31 coextensive with the wall of cavity 24.

A permanent magnet 32 is mounted within cavity 24 and is preferably of generally U-shaped configuration including a closed end 33 resting on base plate 27 and curved legs 34 projecting upwardly and terminating in contact with the annular disk 20 and adjacent the lower edge of the annular surface 30. The spacing between the free ends of legs 34 is such that the cylindrical extremity 16 can be inserted therebetween with the disk 20 moving into position against the free ends 34 with the bearing surface 19 against bearing element 29. In this way, bearing surfaces 19 and 29 will cooperate with the magnetic disk 20 from the force of attraction of the magnet 32 to align and to hold the projection 14 in centered relation within the cavity 24.

In order to permit close adjustment of the extremity 16 within the socket, transverse bores 35 are formed in the legs 34 of magnet 32 and in aligned relation with tapped holes 36 in opposite sides of hollow boss 26 to receive centering screws 38 extending into engagement with indentations 23 formed on bearing ring 22.

It will be evident that by suitable adjustment of the screws the projection 14 may be angularly adjusted within very close tolerances relative to the hinge so that upon rotation the optical axes of the binocular halves will remain in parallel relation to one another.

In practice, to interconnect the hinge portions 10 and 12, the projection 14 is inserted through the entrance until the frustro-conical bearing surface 19 moves into contact with the frustro-conical bearing element annular disk 20 moving into the field of attraction of the permanent magnet 32. The centering screws 38 are then brought into contact with the indentations 23 on the bearing ring, and adjusted to accurately position the projection along the center axis of the machined boss 26, half of the binocular or of other members being joined is then rotatable about the common central axis through a relatively large angle, limited only by the thickness of the members, while being held together by the magnetic force of attraction between the magnet and the disk. Of particular advantage is the fact that the hinge portions can be aligned to within very close dimensional tolerances through combined use of the bearing surfaces and the centering screws. Furthermore, the degree of force with which the two members remain joined may be controlled or regulated entirely through design and construction of the permanent magnet and ferrous disk. Although two centering screws are of course illustrated, three or more centering screws may be disposed at equal spaced intervals, and the screws may be adjusted either to obtain exact parallelism for some angular relation other than parallel between the binocular halves.

In the form of invention shown in FIGS. 1 and 2, when the hinge portions are secured in connected relation, a holding force is developed when the disk 20 contacts or is brought into the field of attraction of the magnet 32, and a constant force of attraction is maintained notwithstanding the relative rotation between the elements.

Alternatively, and as seen in FIG. 3 a disk 20' may take the form of a permanent magnet having semicircular portions of opposite polarity as indicated by "N" and "S." The disk 20' would be placed on the projecting magnetic element 14 in place of the disk 20 so that the magnetic poles would be aligned for movement into contact with the free ends 34 of the magnet 32, the ends 34 being of opposite polarity to the disk portions to normally develop a force of attraction therebetween. Upon rotation either of the disk or magnet, for example, pole "N" of the disk 20' will gradually move away from the opposite pole at one free end 34 and toward the like magnetic pole at the other free end 34, until finally opposing forces are developed between like poles of the disk 20' and magnet 32 tending to cause separation of the hinge portions. Accordingly, regions of opposite polarity between the magnets 20' and 32 will maintain a constant force of attraction over a predetermined angle of rotation; beyond that angle continued rotation will set up opposing forces as described.

An alternate form of hinge device is illustrated in FIG. 4, this form being specifically designed for use in separably connecting binocular halves having hinge portions 42 and 44. Hinge portion 42 has spaced trunnion arms 45 and 46 extending perpendicular to the optical axis of its binocular half, and the hinge portion 44 has like trunnion arms 47 and 48 arranged in perpendicular relation to its optical axis. To effect releasable connection between the binocular halves, trunnion arm 45 has a frustro-conical boss 50 projecting inwardly therefrom. Boss 50 is defined by a surface 51 of generally frusto-conical shape and includes a threaded screw 52 threaded into the arm 45 along an axis parallel to the optical axis of the binocular half. The other end of boss 50 has a shallow recess 54 for insertion of a permanent magnet 55, the latter being permanently connected in place such as by means of a suitable adhesive or a connecting screw passed through the magnet into the body of boss 50.

In turn, the end of trunnion arm 47 has an opening 58 extending on an axis parallel to the optical axis of the binocular half thereof, and a bearing insert 60 is mounted in the opening 58. Insert 60 has a lower threaded end 61 extending beyond area 47 and it is engaged at 62 by an internally threaded end cap 63. Positioned within the end cap 63 is a permanent magnet 64 disposed in upwardly facing relation symmetrically about the axis of the opening and of a polarity opposite to that of the magnet 55 so as to establish a force of attraction therebetween.

The bearing insert 60 conforms to frusto-conical surface 51 so that upon projection of boss 50 into bearing insert 60 a nice bearing fit will be obtained, the force of attraction between the magnets holding the two halves 42 and 44 together.

Additional structure is provided for properly aligning the binocular halves, and the arm 46 for hinge portion 42 includes an opening 68 coaxial with the boss 50 and provided with enlarged counter bores 69 and 70 at each end thereof. A centering pin 73 is held in the arm 46 at opening 68 by a mounting screw 74 having a head 75. Mounting screw 74 and centering pin 73 are assembled in place, so that the inner end of the centering pin 73 is brought into firm seating engagement at the lower counterbore 69 with the head 75 seated firmly at counterbore 70.

The centering pin 73 is dimensioned for close-fitting insertion within an opening 78 formed in the arm 48 in spaced coaxial relation to the boss 50 and bearing 60. In this way, the centering pin will be inserted within the opening 78 as the projection 59 moves into the socket formed within opening 58 along a common center axis. Preferably, the centering pin 73 is made of a hard, low-friction material to permit free rotation between the elements while accurately centering and aligning the parts for movement about the common axis of connection.

It will be apparent that the spacing between the arms 45–46 and 47–48 is such that the projection 50 and centering pin will simultaneously move into inserted relation within the washer 60 and opening 78, respectively, and with the force of attraction between magnets 55 and 64 securely holding the elements in place against accidental release. In composition, both magnets may be composed of materials which can be permanently magnetized and of opposite polarity so as to maintain a constant force of attraction between the arms in connected relation or, each magnet may have semi-circular portions of opposite polarity whereupon attracting forces are developed only through a limited angle of rotation, as described with respect to FIG. 3.

From the foregoing description of the different forms of the present invention, it will be apparent that a magnetic junction between the members may be formed wherein each hinge portion has a permanent magnet, or where one portion contains a permanent magnet and the other has a material magnetized by the force of attraction of the permanent magnet when the two halves are brought into connected relation. In cooperation therewith, the bearing surfaces will align the hinge portions in centered coaxial relation, and the portions can be adjusted about the central axis by the use of one or more centering elements such as are illustrated in the form shown in FIGS. 1 and 2. Accordingly, in either form of invention a relatively simple and inexpensive hinge has been devised incorporating a minimum number of parts and which can be inexpensively fabricated and assembled for effective use, especially where close dimensional tolerances are required. It is therefore to be understood that various modifications and changes may be made in the construction and arrangement of elements comprising the forms of invention illustrated and described without departing from the spirit and scope of the present invention as defined by the appended claims.

What is claimed is:

1. A hinge for releasably interconnecting the halves of a binocular and the like comprising cooperating hinge portions, one hinge portion having a cavity extending in a direction parallel to the optical axis, said cavity being provided with an inwardly tapered bearing surface at the entrance thereto and a magnet positioned within said cavity, the other hinge portion including a projection extending in a direction parallel to its optical axis and being dimensioned for releasable insertion within said cavity, said projection including a conical bearing surface engageable with said tapered bearing surface at the entrance to said cavity and a magnetic element on said projection movable into the field of said magnet upon insertion of said projection within said cavity, the force of attraction of said magnet being sufficient to hold said hinge portions together against accidental release while permitting relative rotation therebetween.

2. A hinge according to claim 1, said magnet being arranged in centered relation within said cavity and said magnetic element being disposed in centered relation on said projection for movement into contact with said magnet upon movement of said bearing surfaces into contacting relation.

3. A hinge according to claim 1, said permanent magnet being generally U-shaped having spaced free end portions projecting outwardly from the interior of said cavity toward the entrance in symmetrical relation about the axis of said cavity, and said projection having a magnetic disk positioned thereon for movement into the field of said permanent magnet upon insertion of said projection into said cavity.

4. A hinge according to claim 3, the free end portions of said permanent magnet being of opposite magnetic polarity and said magnetic disk having portions of opposite magnetic polarity, each of said disk portions being movable into the magnetic fields of said free end portions to develop a mutual force of attraction or opposition therebetween according to the relative disposition between said cavity and said projection.

5. A hinge releasably connecting a pair of relatively rotatable hinge portions for rotation about a common axis comprising a first hinge portion having a cavity therein lying on said axis of rotation, a projecting member on the other hinge portion being adapted for releasable insertion in said cavity, magnetic elements on each of said cavity and said projecting members, the force of attraction between said magnetic elements being sufficient to releasably hold said projecting member against accidental release upon insertion within said cavity, and alignment means between said cavity and projecting members movable into engagement with one another when said projecting member is inserted in said cavity, said aligning means cooperating with said magnetic elements to enable relative rotation between said hinge portions while being held against accidental release under the attractive force of said magnetic elements, and said aligning means including a centering pin on one hinge portion with an opening on the other hinge portion for receiving said pin upon insertion of said projecting member into said cavity, and said pin and open being disposed in spaced, coaxial relation to said cavity and projecting member upon insertion of said pin within the opening.

6. A hinge releasably connecting a pair of relatively rotatable hinge portions for rotation about a common axis comprising a first hinge portion having a cavity therein lying on said axis of rotation, a projecting member on the other hinge portion being adapted for releasable insertion in said cavity, magnetic elements on each of said cavity and said projecting members, the force of attraction between said magnetic elements being sufficient to releasably hold said projecting member against accidental release upon insertion within said cavity, and alignment means between said cavity and projecting members movable into engagement with one another when said projecting member is inserted in said cavity, said aligning means cooperating with said magnetic elements to enable relative rotation between said hinge portions while being held against accidental release under the attractive force of said magnetic elements, said aligning means including a conical bearing surface at the entrance to said cavity and a conical bearing surface on said projecting member conforming in contour to the bearing surface on said cavity to align said projecting member in centered relation to said cavity upon insertion therein.

7. A hinge releasably connecting a pair of relatively rotatable hinge portions for rotation about a common axis comprising a first hinge portion having a cavity therein lying on said axis of rotation, a projecting member on the other hinge portion being adapted for releasable insertion in said cavity, magnetic elements on each of said cavity and said projecting members, the force of attraction between said magnetic elements being sufficient to releasably hold said projecting member against accidental release upon insertion within said cavity, and alignment means between said cavity and projecting members movable into engagement with one another when said projecting member is inserted in said cavity, said aligning means cooperating with said magnetic elements to enable relative rotation between said hinge portions while being held against accidental release under the attractive force of said magnetic elements, said cavity having adjustable centering screws extending transversely through the same for engagement with and positioning of said projecting member in predetermined relation within said cavity.

8. A hinge comprising a pair of hinge portions rotatable with respect to each other on a common axis, the first of said hingle portions having a cavity therein lying on said axis of rotation, a projecting member of magnetically susceptible material on the other of said hinge portions adapted to enter said cavity, and a magnet held in said cavity for effecting alignment of said rotatable hinge portions and to provide connected relative rotation of said hinge portions and a releasable connection therebetween, said hinge portion having said cavity therein provided with adjustable centering means for positioning said projecting member in predetermined angular relation within said cavity.

References Cited by the Examiner

FOREIGN PATENTS 861,817   1/1953   Germany.

EDWARD C. ALLEN, *Primary Examiner.*

JOSEPH D. SEERS, *Examiner.*

D. L. TROUTMAN, *Assistant Examiner.*